US006539885B2

(12) United States Patent
Tylaska

(10) Patent No.: US 6,539,885 B2
(45) Date of Patent: Apr. 1, 2003

(54) LOCKING SHACKLE APPARATUS

(76) Inventor: Timothy Tylaska, 138 N. Stonington Rd., Mystic, CT (US) 06355

(*) Notice: Subject to any disclaimer, the term of this patent is extended or adjusted under 35 U.S.C. 154(b) by 75 days.

(21) Appl. No.: 09/866,382

(22) Filed: May 25, 2001

(65) Prior Publication Data

US 2002/0174815 A1 Nov. 28, 2002

(51) Int. Cl.$^7$ .................................................. B63H 9/04
(52) U.S. Cl. ....................................................... 114/108
(58) Field of Search ................................. 114/108, 109, 114/113

(56) References Cited

U.S. PATENT DOCUMENTS

| 3,850,468 A | * 11/1974 | Hultin | 294/82.34 |
| 4,093,293 A | * 6/1978 | Huggett | 114/113 |
| 4,590,882 A | * 5/1986 | Murphy | 114/108 |
| 5,195,223 A | * 3/1993 | Tylaska | 24/602 |
| 5,904,112 A | * 5/1999 | Tylaska et al. | 114/108 |

* cited by examiner

Primary Examiner—S. Joseph Morano
Assistant Examiner—Lars A. Olson
(74) Attorney, Agent, or Firm—William B. Ritchie

(57) ABSTRACT

An improved shackle apparatus and a locking mechanism for the same. The shackle is of a thimble type design and includes a locking mechanism for locking the shackle open and closed. The shackle apparatus allows for secure locking, easier operation, higher strength and less susceptible to problems of wear. The locking mechanism includes a plunger pin connected to a knob that mates with the shackle body to prevent the plunger pin from rotating and/or retracting, and the shackle from opening. This design prevents the plunger from both rotational as well as translational movement during extreme flogging, dragging and impact to prevent accidental opening. The shackle can be operated with one hand for the inside surface of the hook is "proud" above the surface of the clevis. This arrangement transforms any force applied to the latching side of the shackle into a moment which helps the hook close and allows the plunger pin to be snapped closed with the use of one hand. Higher strength is accomplished by implementing a structural protrusion on the shackle body which interlocks with the hook and reduces shear stress on the plunger pin. Less susceptibility to problems of wear is accomplished by thinning the hook and providing a boss around its pivot so as to increase the clearance between any burrs or deformed metal on the clevis and hook.

8 Claims, 11 Drawing Sheets

LOCKING SHACKLE APPARATUS

FIELD OF THE INVENTION

The invention relates to shackles used for joining two members under tension and more articularly to a locking shackle apparatus and a locking mechanism for the same.

BACKGROUND OF THE INVENTION

The technique of attaching two members together under tension, such as a rope or cable, can be accomplished with the use of a shackle. In many instances such as in the field of sailing, it is desired to reduce to a minimum the distance between the attachment point of the line and the latching throat of the shackle. Such an instance occurs on a halyard when desiring to hoist the sail to the extreme top of the mast. In other instance, it is desired to reduce to a minimum the overall width and profile of the shackle such as to allow the shackle to pass through a Genoa block or other tight passage. In both cases, the desired arrangement consists of a thimble-like snap shackle onto which the line or cable can be directly spliced around its body.

Thimble-like rope type snap shackles such as described are commercially available but have many drawbacks. First, they are often subject to violent flogging and impact against a mast or are repeatedly dragged across a deck. Existing snap shackles are extremely prone to accidentally popping open under such circumstances. This accidental opening is so common that the current "state of the art" procedure in the sailing industry has been to wrap masking tape around the shackle. A second drawback with current thimble type shackles is the difficulty in quickly opening or closing the shackle with limited sense of feel or sight. In many instances, sailors are in rough seas or are wearing gloves and it is not always possible to physically look at or feel the shackle when operating it. Existing thimble type shackles require the plunger knob to be precisely aligned before it can be operated, resulting in dangerous or inefficient situations. A third problem with existing thimble type rope shackles and with plunger pin shackles in general is that a high side loading is applied to the plunger pin. Frequently the plunger pin becomes permanently bent and the shackle is inoperative. Finally, a fourth problem with rope shackles and other shackles in general is the binding of the hook against deformed or fretted material along the inside of the clevis. After extended use, the constant pressure and sliding of a fitting latched to the shackle throat tends to deform and erode the material along the inside walls of the clevis slot. Eventually the clearance between the clevis wall and the pivoting hook decreases to a point where the hook begins to bind and no longer hinges correctly.

The earliest attempt to solve some of these problems was with a J-Lock shackle containing a plunger pin. However, these shackles did not have any method of locking the pin into place. As a result, the plunger pin would often pop open during either severe flogging or when dragged across the deck. These old J-Locks were cast from bronze and were produced at least 40 years ago and by some account, perhaps up to 100 years ago.

The next attempt to improve the shackle was a new design on the J-Lock that was made about 30 years ago. In this design, the knob on the plunger pin contained a notch, which had to be turned to the correct orientation so as to allow a keyway on the body to line up with the slot in the knob. To open the shackle, the knob would be turned to the correct orientation so as to allow the notch in the knob to pass over the keyway type protrusion on the body. To close the shackle, the notch would again be lined up, the plunger pin snapped shut, and the knob then turned to some random orientation so as to misalign the notch with the keyway protrusion.

While this J-Lock design was an improvement over the earliest version, there are several drawbacks with this design. First, during flogging, the knob tended to rotate from vibration and eventually work its way to the orientation such that the notch and keyway line up. Then, the shackle would pop open. Second, when pulled over a deck, the knob tended to roll and invariably rotate to the "bad" orientation whereas it eventually pops open. For years, the solution to this rotation and vibration problem has been to wrap tape around the knob and shackle so as to lock it in place. The tape must be ripped off whenever the shackle must be opened, and re-tapped the next time it is shut. This is very inconvenient and can be very dangerous to sailors in rough waters, but has been the only way to prevent opening during flogging or handling. The procedure has been the "state of the art" for as long as most sailors can remember.

Thirdly, this J-Lock design is very difficult to quickly line up the notch with the keyway so as to open the shackle in a hurry. When the existing J-Lock is snapped shut and the knob rotated to a random position, it is difficult to find the position that allows the notch to line back up again. One must look or feel for the notch and keyway orientation, usually whilst the user is with gloves and cold fingers. During a sailboat race it is next to impossible to visually observe the orientation of the knob. Thus, the alignment must be done by sense of feel alone and becomes very frustrating.

A fourth problem with the existing J-Lock design pertains to the alignment of the knob.

In many cases, it is desirable to be able to quickly shut the shackle by snapping the hook shut as is done on conventional pull pin shackles. This quick shutting feature is particularly desirable during fast paced sailboat races. With the existing J-Lock, one must first pre-align the knob notch with the protrusion on the body. Assuming no change in orientation occurs, one should then be able to simply snap the hook shut. The hook pushes onto the free end of the pull-pin, forcing the knob to lift up past the body protrusion and then snaps back shut again. This is what would ideally be desired. However, with the existing J-Lock design, even the pre-alignment does not always allow the shackle to operate as desired. The contact of the hook with the free end of the pull-pin sometimes imparts a rotation onto the pull-pin which in turn misaligns the notch on the knob with the protrusion on the body. As a result of this misalignment, the knob jams into the bottom of the body protrusion and will not snap shut. Such a problem is extremely frustrating and causes the loss of valuable time in a sailboat race.

A fifth problem exists with the current J-Lock shackle. While loading a substantial amount of force onto the pull pin, the pull pin tends to bend and become permanently deformed. It any bending occurs, the pull pin cannot be slid open or closed and the shackle is destroyed.

And finally, the existing J-Lock hook geometry at the location where the hook pivots through the clevis case fosters fretting and destroys the shackle with continued use. When the hook is shut and the shackle loaded, the loaded member exerting force against the inside surface of the J-Lock is usually a metal ring or other metal fitting. After continued use, fretting and wear on the body clevis and hook surface causes the clevis and hook base material to "roll over" on the edges. Burrs caused from this edge "roll over" eventually reduce the clearance so much that the hook binds inside the clevis and will no longer open or shut smoothly.

Therefore a need exists in the art for an improved design of a shackle that will not accidentally open when exposed subject to violent flogging and impact against a mast or when repeatedly dragged across a boat deck, that overcomes the difficulty in quickly opening or closing the shackle with limited sense of feel or sight, that does not require high side loading to be applied to the plunger pin, and is not vulnerable to binding of the hook against deformed or fretted material along the inside of the shackle clevis.

SUMMARY OF THE INVENTION

The present invention relates to a shackle with a locking mechanism, the shackle is composed of a shackle body having a hook opening with a shackle pivot hole, a plunger pin opening for a plunger pin with a corresponding plunger pin exit, an anti-rotation plunger means such that the plunger pin opening is located on the anti-rotation plunger means, a hook body having a pivotal end having two sides and a hook pivot hole and a locking end, the pivotal end being pivotally connected within the hook opening of the shackle body by a pivot pin extending through the shackle pivot hole and hook pivot hole, the locking end having a slot corresponding to the plunger pin opening. The plunger pin has a free end and a transition to a smaller end, the smaller end of the plunger pin is axially inserted into the slot of the hook body and extends into the plunger pin opening in the shackle body. The plunger pin has two positions such that the two positions form corresponding settings for the shackle, whereby a closed setting is formed when the free end rests in the slot of the hook body, and an open setting is formed when the free end remains in the shackle body. There is a spring positioned around the smaller end of the plunger pin and located inside the plunger pin opening in the shackle body and constrained by the corresponding plunger pin exit in the shackle body, whereby compression and release of the spring creates the positions of the plunger pin. There is a knob attached to the smaller end of the plunger pin and resting on the anti-rotation plunger means on the shackle body, the knob having an opening that accepts the plunger pin, and a mating means on an axial face which mates with the anti-rotation plunger means such that when the mating means and the anti-rotation plunger means mate the locking mechanism is created whereby the plunger pin is locked into the one of the two positions, lifting the knob compresses the spring and allows the position of the plunger pin to change to the other position.

The present invention also relates to a locking mechanism for a shackle, the locking mechanism composed of a shackle plunger pin, the plunger pin has a free end and a transition to a smaller end. The locking mechanism is also composed of a spring positioned around the smaller end of the plunger pin, the plunger pin and spring located inside the shackle, the shackle has an anti-rotation plunger means and two positions, the positions are an open and a closed position. Also there is a knob attached to the smaller end of said plunger pin, the knob has an opening that accepts the plunger pin, and a mating means on an axial face which mates with the anti-rotation plunger means such that when the mating means and the anti-rotation plunger means mate the locking mechanism is created whereby the plunger pin is locked into a position. By lifting said knob compresses the spring and allows the position of said shackle to change to the other of the positions of the shackle.

Therefore, it is an aspect of the invention to provide an improved shackle apparatus which overcomes the deficiencies of the prior art shackle design.

It is another aspect of the invention to provide an improved shackle apparatus that simplifies the design of prior art shackle designs.

It is another aspect of the invention to provide an improved shackle apparatus that resists opening during flogging, impact or when dragged over a surface.

It is another aspect of the invention to provide a means of securing the plunger from motion by the use of a locking arrangement.

It is another aspect of the invention to provide an improved shackle apparatus that contains a "double locking" plunger pin which is constrained from moving in both rotational and translational directions.

It is another aspect of the invention to provide an improved shackle apparatus that self-aligns the plunger knob so as to allow easy opening with limited reliance on sight and feel.

It is another aspect of the invention to provide an improved shackle apparatus that self-aligns the plunger knob so as to allow easy closing with limited reliance on sight and feel.

It is another aspect of the invention to provide an improved shackle apparatus that contains a plunger knob which can be rotated and placed in a "locked" position which resists both translational and rotational motion.

It is another aspect of the invention to provide an improved shackle apparatus that contains a knob which contains a mating means that can mate with an anti-rotation plunger means on the shackle body and prevent retraction of the plunger pin by preventing both rotation and lifting of the knob.

It is another aspect of the invention to provide an improved shackle apparatus that contains a plunger knob which is partially restrained from rotational motion when the shackle is being snapped shut so as to prevent the plunger knob from accidentally rotating into a misaligned position due to rotational force imparted to the free end of the plunger pin by contact from the closing hook.

It is another aspect of the invention to provide an improved shackle apparatus that contains a structural protrusion between the shackle body and the hook body so as to reduce the amount of stress carried by the plunger pin and increase the overall strength of the shackle.

It is another aspect of the invention to provide an improved shackle apparatus that consists of a hook opening which contains a contact surface which is "proud" with respect to the surface of the shackle clevis so as to allow any applied force to aid in holding the hook against the shackle body when the plunger pin is snapped closed.

It is another aspect of the invention to provide an improved shackle apparatus that allows a rope or cable to be directly spliced over the body.

It is another aspect of the invention to provide an improved shackle apparatus that can be passed through a pulley block or other tight passage.

It is another aspect of the invention to provide an improved shackle apparatus that contains a minimal distance between the spliced attachment point and the member which the shackle attaches to.

It is another aspect of the invention to provide an improved shackle apparatus which can be set into in a locked and secured state so as to allow the user to be aware of the engagement of the locked state with a minimal reliance on sight or feel.

It is another aspect of the invention to provide an improved shackle apparatus which can be easily switched from an unlocked state to a locked state and vise versa.

It is another aspect of the invention to provide an improved shackle apparatus which resists opening due to accelerations in any translational or rotational direction.

It is final another aspect of the invention to provide an improved shackle apparatus that attempts to reduce binding of the hook inside the clevis due to wear or fretting.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
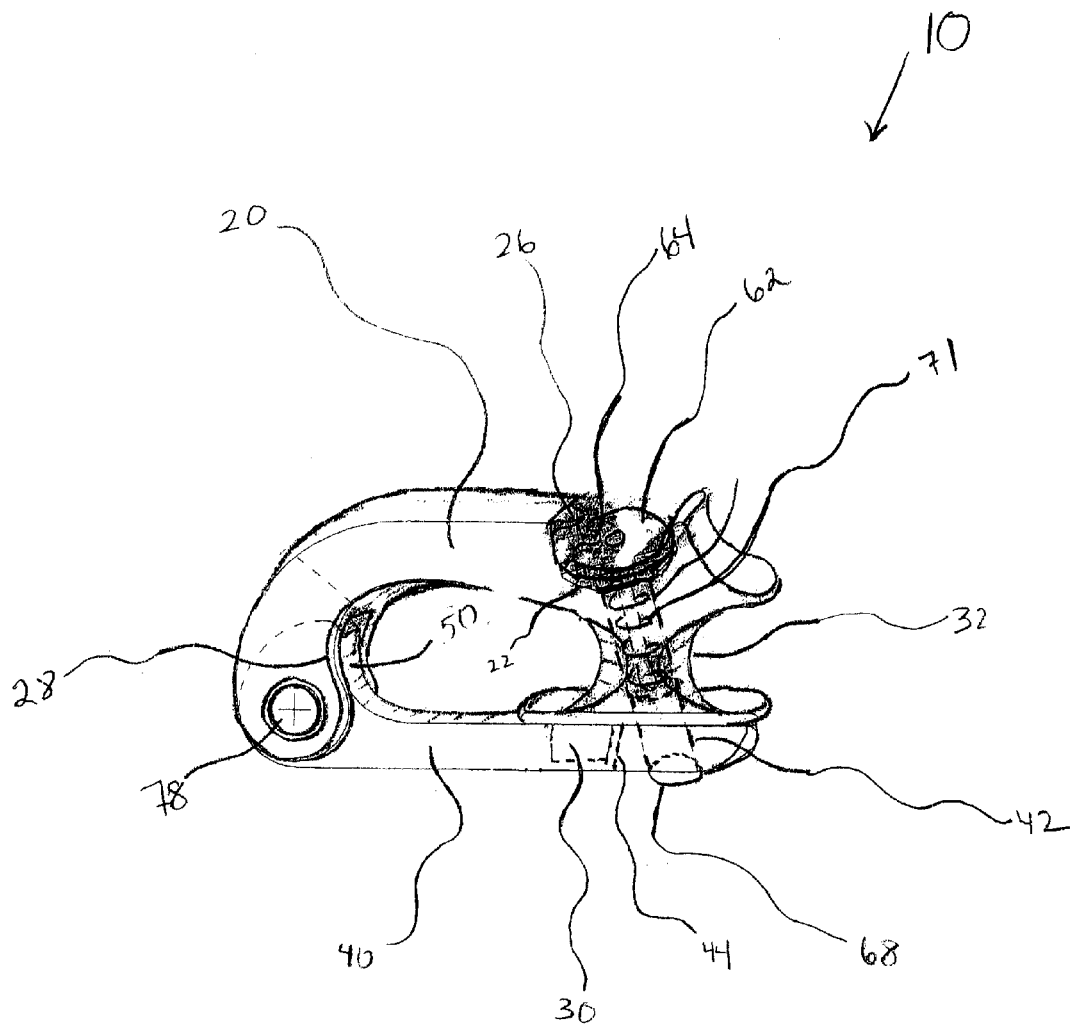
FIG. 1 is an isometric view of the shackle apparatus in its assemble configuration.

Referring first to FIG. 1, an isometric view of the locking shackle apparatus 10 is shown. The shackle apparatus 10 is a thimble type shackle apparatus, where the shackle apparatus 10 shape is optimized to meet space requirements. The shackle apparatus 10 is designed to be used on the ends of Genoa sheets and is spliced onto the line around the thimble shape 32 shape section of the shackle body 20 and has a small enough profile that it can actually be fed through the Genoa block. This allows the sheet to be changed from one side of the boat to another without having to feed all the line back through the pulley. As the shackle apparatus 10 fits through the block, the end of the sheet is merely pulled through one block and then fed through the block on the other side of the boat. This drastically speeds up tacking and is very beneficial on racing yachts.

Figure 2:
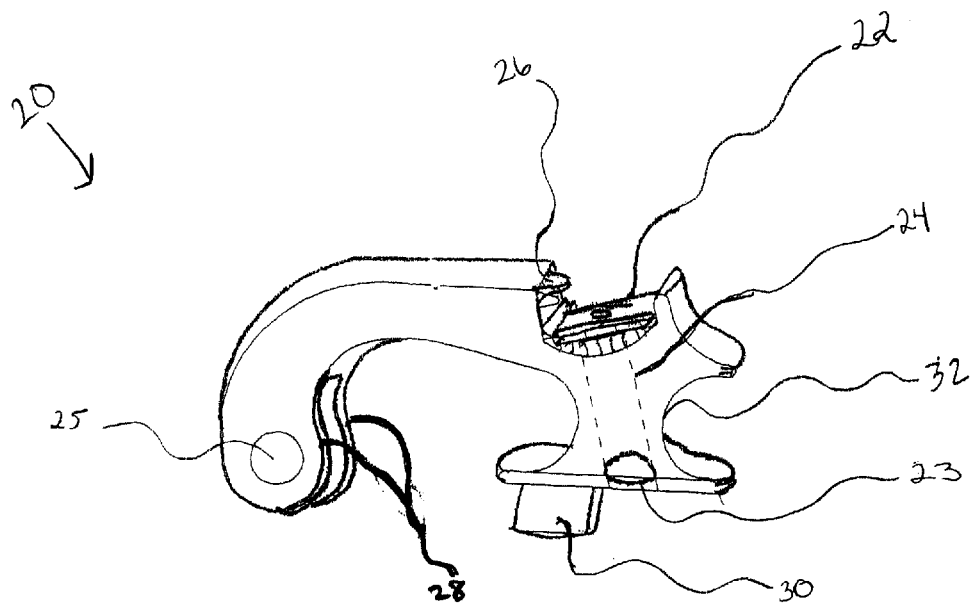
FIG. 2 is an isometric view of the shackle body.

The shackle apparatus 10 is entirely constructed from high strength stainless steel. In other embodiments, other types of material known by those of ordinary skill in the art that are equally durable are used to manufacture the shackle apparatus 10. These materials include titanium, aluminum, plastics and nickel-plated steel. The surfaces of the shackle apparatus 10 are highly polished to resist corrosion. In its preferred embodiment, the shackle apparatus has a total width of about 3 inches, a height of about 1½ inches and a depth of about ⅝ inches. In other embodiments the width, height and depth are larger or smaller, but the preferred embodiment ratios are basically consistent. Shackle apparatus 10 consists of shackle body 20, a hook body 40, where the hook body 40 is attached to the shackle body 20 by a plunger pin 68. Referring next to FIG. 2, the shackle body 20 has a plunger pin opening 24 for a plunger pin 68, a shackle body lip 26, an inside wall clevis 28, and a structural protrusion 30. In the preferred embodiment, the shackle body's dimensions are about 3 inches in width, about 1 ½ inches in height and about ⅝ in depth, but in other embodiments the overall dimension of the shackle body 20 is larger or smaller, but the width to height to depth ratio remains basically the same. The plunger pin opening 24 is dimensioned according to the size of the plunger pin 68 used in constructing the shackle apparatus 10. The plunger pin opening extends through the shackle body 20 and has a plunger pin exit 23.

Figure 4:
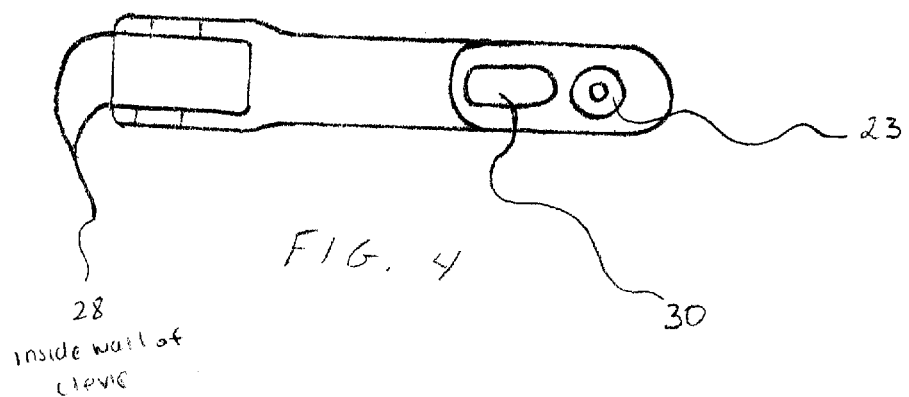
FIG. 4 is a bottom view of the shackle body.
Figure 5:
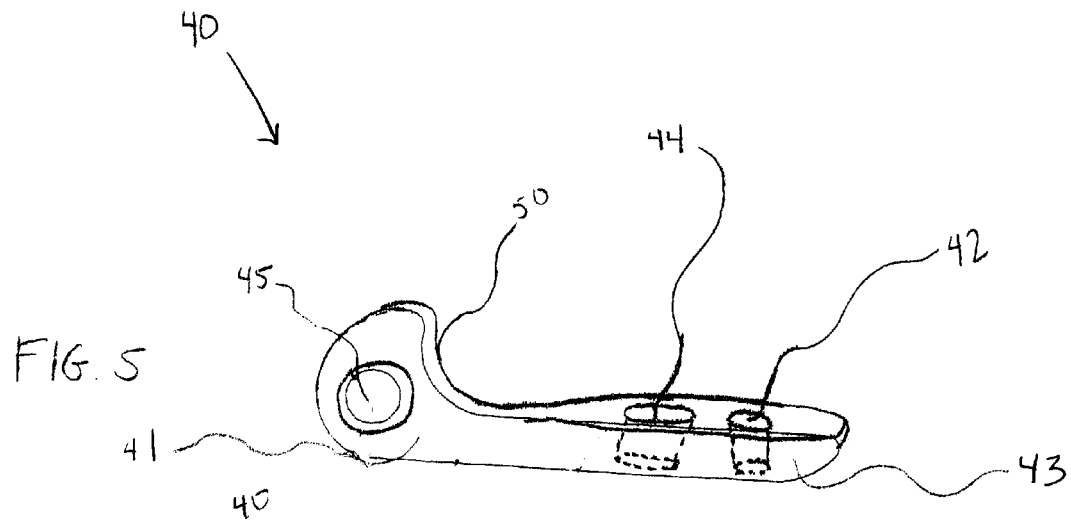
FIG. 5 is an isometric view of the hook body.
Figure 6:
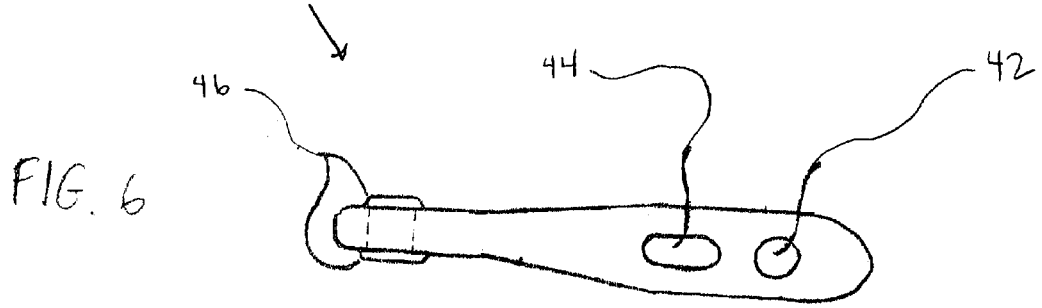
FIG. 6 is a top view of the hook body.
Figure 7:
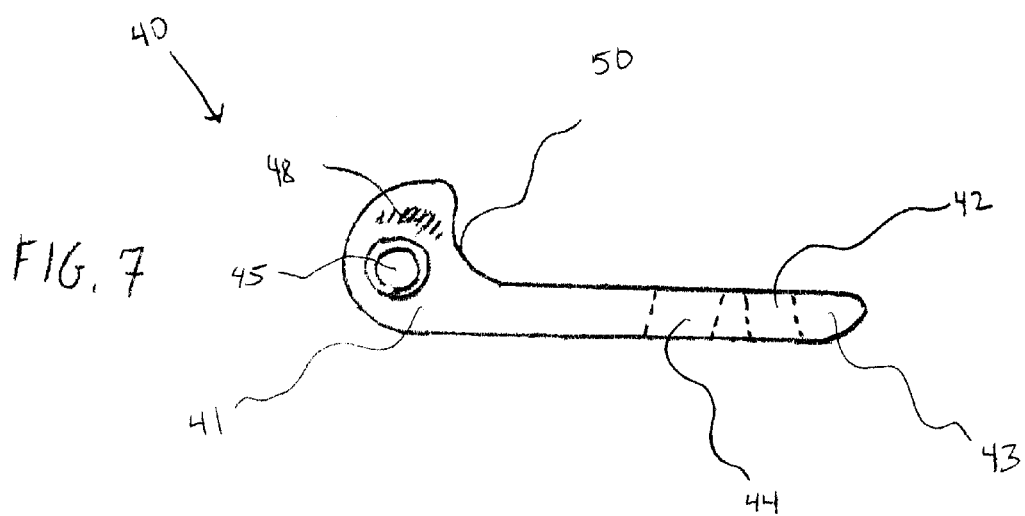
FIG. 7 is a side view of the hook body.
Figure 9:
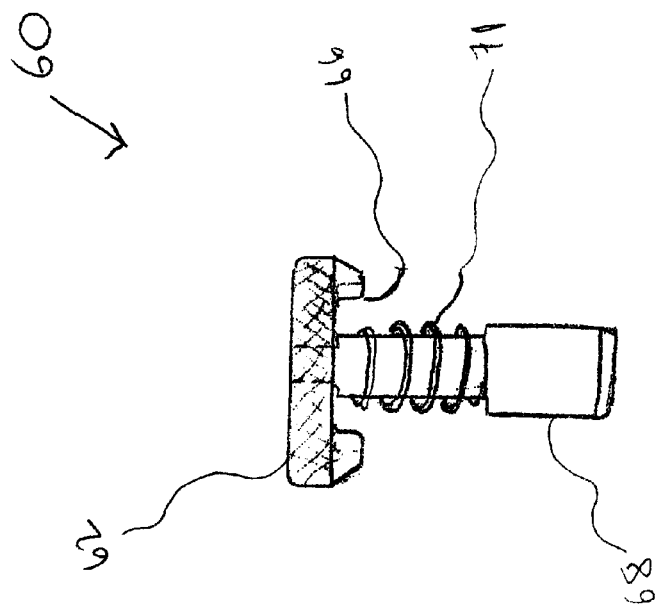
FIG. 9 is a side view of the plunger pin and knob.

Referring next to FIGS. 5,6, and 7, the hook body 40 consists of a pivotal end 41, a locking end 43, a hook body slot 44, a hook body opening 42, a proud surface 50, and an outside hook surface 46. The hook body opening 42 corresponds to plunger pin exit 23 shown in FIG. 4. The hook body slot 44 corresponds to the structural protrusion 30 shown in FIGS. 2 and 4. The hook body 40 is dimensioned such that it's length corresponds to the length of the shackle body 20. The width of the hook body 40 is dimensioned so that the pivotal end 41 fits between the inside walls of clevis 28 in FIG. 2.

Figure 23:
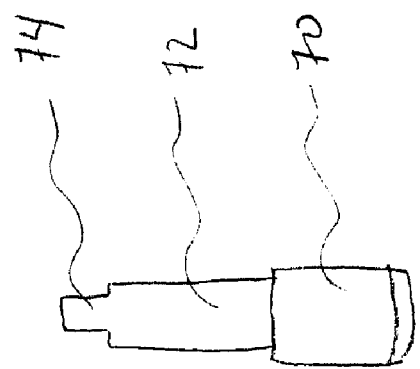
FIG. 23 is a side view of the plunger pin.

Referring now to FIG. 23, the plunger pin 68 has a free end 70 dimensioned such that it corresponds to hook body opening 42. The plunger pin has a transition section 72, and a smaller end 74. The smaller end 74 is dimensioned such that it corresponds to the plunger pin slot 24 in the shackle body 20. In its preferred embodiment, the plunger pin is cylindrical, but in other embodiments, the plunger pin may be of another appropriate shape. In the preferred embodiment, the plunger pin free end 70 has a diameter of approximately $5/16$ and a length of approximately $9/16$, the transition section 72 a diameter of approximately $7/32$ inches and a length of approximately $25/32$, and a smaller end 74 diameter of approximately $5/32$ with a length of approximately $5/32$ inches. The total length of the plunger pin 68 corresponds to the size of the shackle apparatus 10.

Figure 11:
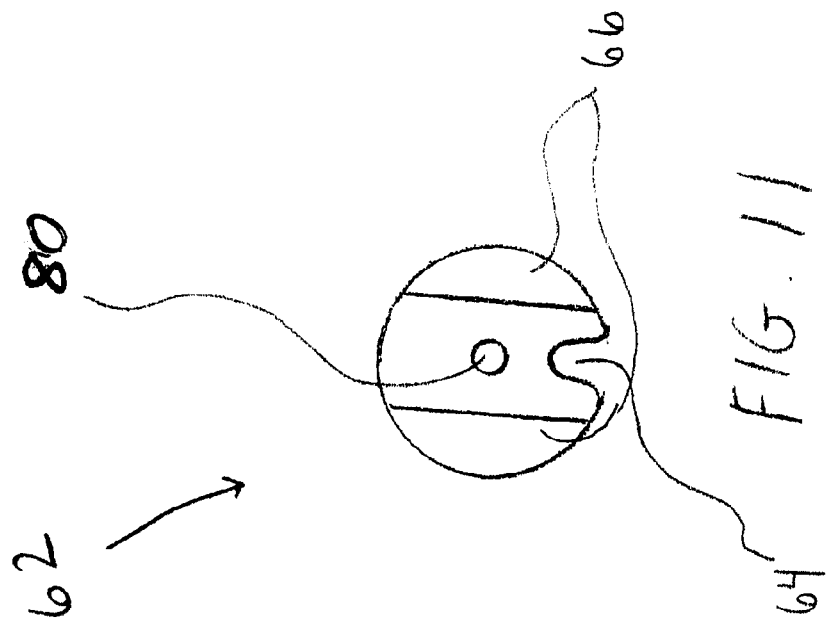
FIG. 11 is a bottom view of the plunger pin and knob.
Figure 10:
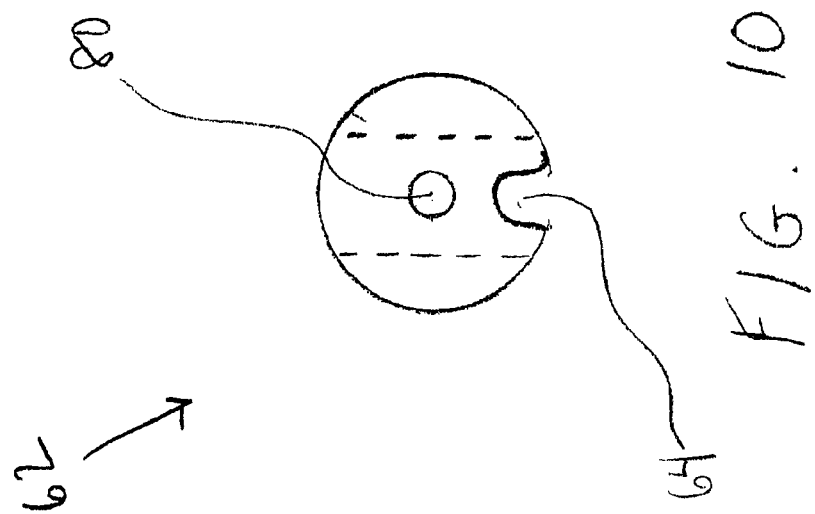
FIG. 10 is a top view of the plunger pin and knob.

Referring next to FIG. 10 and 11, the knob 62 is shown. In its preferred embodiment, the knob 62 is concentric and has an opening 80 in its center. The opening 80 is designed and dimensioned such that it corresponds with the smaller end 74 of the plunger pin 68 as shown in FIG. 23. In its preferred embodiment, the opening 80 is round, but in other embodiments, the opening 80 is the same shape as the smaller end 74 of the plunger pin 68, thus corresponding to the other embodiments of the smaller end 74 of the plunger 68. In its preferred embodiment, the knob 62 has a notch 64 on a radial side. Referring to FIG. 11, the bottom view of the knob, mating means 66 are shown.

Figure 24:
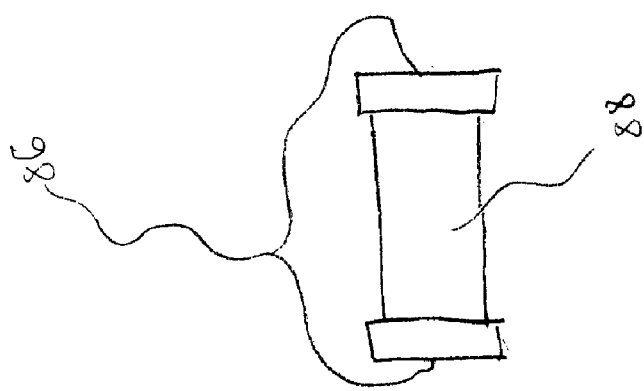
FIG. 24 is a side view of the pivot pin.

Referring now to FIG. 24, the pivot pin 78 has two sides 86 and a connecting pin 88. In the preferred embodiment, the two sides are round and dimensioned such that they are slightly larger than the shackle pivot hole 25. The preferred embodiment of the pivot pin 78 is about $5/16$ in diameter and about ¾ long. In other embodiments, the sides 86 are square, triangular, or any other geometric shape that is used by those in the art. The connecting pin is cylindrical and in its preferred embodiment has dimensions of about 5/16 in diameter by about 3/4 in length. In other embodiments, the dimensions increase or decrease depending on the size of the shackle apparatus 10 and the size of the shackle pivot hole 25 and hook pivot hole 45.

Figure 8:
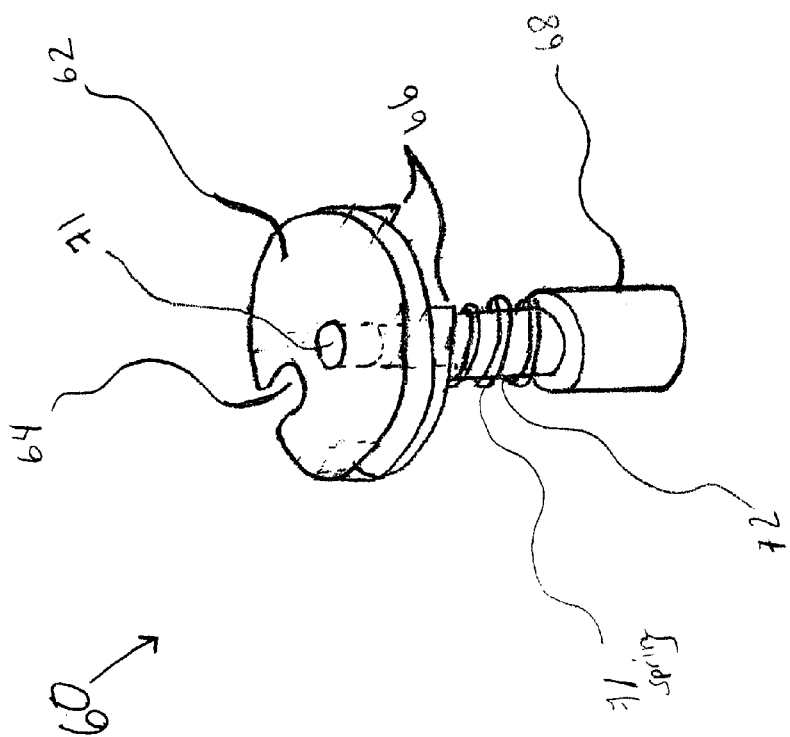
FIG. 8 is an isometric view of the plunger pin and knob.

Referring next to FIG. 8, the assembled knob 62 and plunger pin 68 are shown, with the spring 71 around the plunger pin 68 to form the plunger assembly 60. The spring 71 is shown around the transitional section 72 of the plunger pin 68. In the preferred embodiment, the spring 71 has a pitch of X and a spring constant k between 6 and 7 lb. per inch. The outer diameter of the spring 71 is about 0.30 inches, and the inner diameter of the spring 71 is about 0.24 inches and the spring 71 wire diameter is approximately 0.03 inches. Thus, the spring 71 exerts a force of 6.7 lb. per inch. In other embodiments, the force of the spring 71 remains the same, but the dimensions of the spring vary to correspond with the alternative embodiments of the plunger pin 68. But, in all embodiments, the spring 71 is dimensioned such that it fits around the transitional section 72 of the plunger pin 68 so as to allow the plunger pin 68 to move freely. In its preferred embodiment, the spring assembly is accomplished by inserting the smaller end 74 of plunger pin 68 through the spring 71 and into the opening 80 of the knob 62.

Referring next to FIG. 4, the spring 71 is located inside the plunger pin opening 24 of the shackle body 20. The spring 71 will accept the plunger pin 68 smaller end 74 and then the plunger pin 68 transition section 72. The spring 71 is designed to properly accept and remain around the transition section 72 of the plunger pin 68 and stay inside the plunger pin opening 24 in the shackle body 20.

Figure 20:
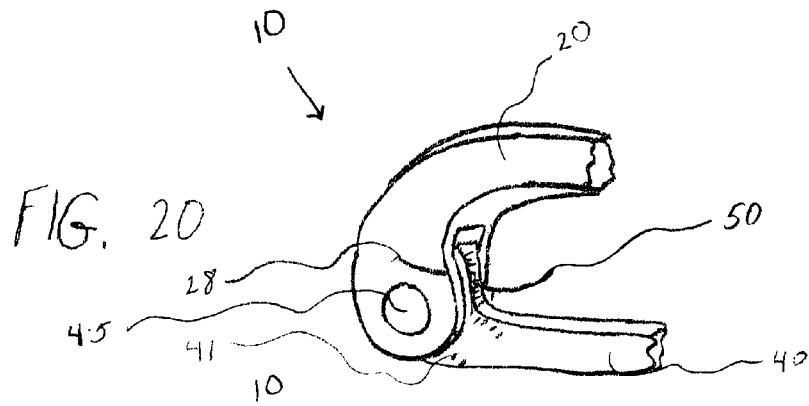
FIGS. 20–22 are isometric views of the shackle apparatus detailing the shackle body inside wall clevis and pivotal end of hook body.

The shackle apparatus 10 is easily assembled through a process of simple steps. Referring first to FIG. 20, the pivotal end 41 of the hook body 40 is placed into the inside wall clevis 28 of shackle body 20. The pivot pin 78 is then inserted through the shackle pivot hole 25, into the hook pivot hole 45, and finally through the other shackle pivot hole 25. In its preferred embodiment, the shackle pivot hole 25 is round with a diameter of about 5/16. The hook pivot hole 45 has identical dimensions to the shackle pivot hole. In other embodiments, the pivot hole is larger or smaller than the preferred embodiment.

Referring next to FIG. 5, the smaller end 74 of the plunger pin 68 is placed through hook body opening 42 on hook body 40. Referring now to FIG. 2, the smaller end 74 of the plunger pin 68 is then placed through the plunger pin exit 23 on the shackle body 20. The smaller end 74 then emerges through plunger pin opening 24, shown in FIG. 3. The knob 62 is placed over the smaller end 74 and the smaller end 74 is inserted into the knob opening 80.

Referring now to FIG. 1, the shackle apparatus 10 is shown in its assembled and closed setting. The structural protrusion 30 rests in the hook body slot 44, and the free end 70 of the plunger pin 68 rests in the hook body opening 42. The structural protrusion 30 in the preferred embodiment has dimensions of approximately 9/32 tall, about 3/16 wide and about 7/16 deep. The structural protrusion 30 is just slightly smaller than the hook body slot 44. The structural protrusion 30 acts to isolate forces applied to the shackle apparatus 10 and prevent bending of the plunger pin 68. The hook body slot 44 is located just in front of the hook body opening 42, which houses the plunger pin 68 in the shackle apparatus 10 closed setting. When the shackle apparatus 10 is loaded, the resulting strain causes the hook body 40 to yield until the hook body slot 44 contacts the structural protrusion 30. At this point, the majority of any additional loading is taken up by the structural protrusion 30 and not by the plunger pin 68. This arrangement allows the shackle apparatus 10 to handle a higher load without the plunger pin 68 becoming permanently damaged. Additionally, during a catastrophic loading, the structural protrusion 30 increases the overall breaking strength of the shackle apparatus 10 considerably.

Figure 21:
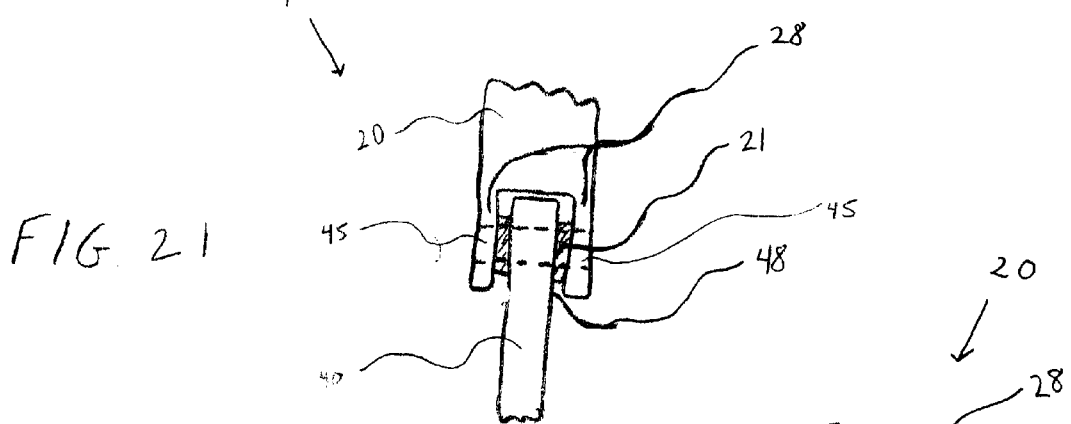
Figure 22:
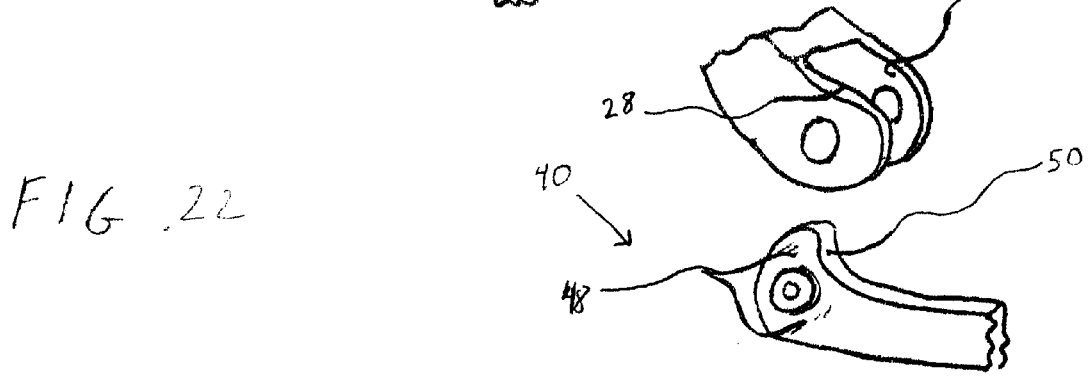

Referring again to FIG. 7, the hook body 40 has an outside surface 48. This outside surface 48 serves to reduce the effect of plastic deformation and metal "roll over" on the inside wall clevis 28 on the shackle body 20. Referring now to FIG. 21, the assembled shackle apparatus 10 is shown in an isometric view of the hook body 40 on the inside wall clevis 28 of the shackle body 20. The outside surface 48 provides adequate clearance between the inside wall clevis 28 because of the implementation of hook boss 21 located on either side of pivot hole 45. This adequate clearance avoids jamming of the shackle apparatus 10 caused by burrs formed from "roll over".

Figure 3:
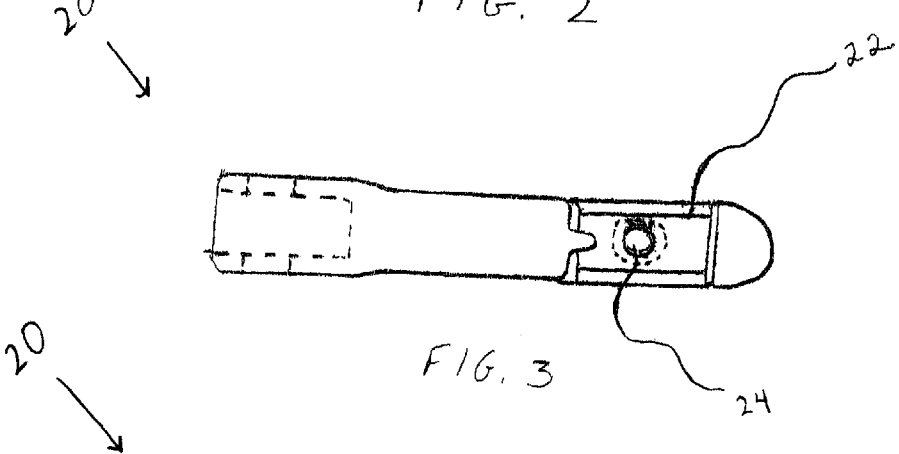
FIG. 3 is a top view of the shackle body.
Figure 12:
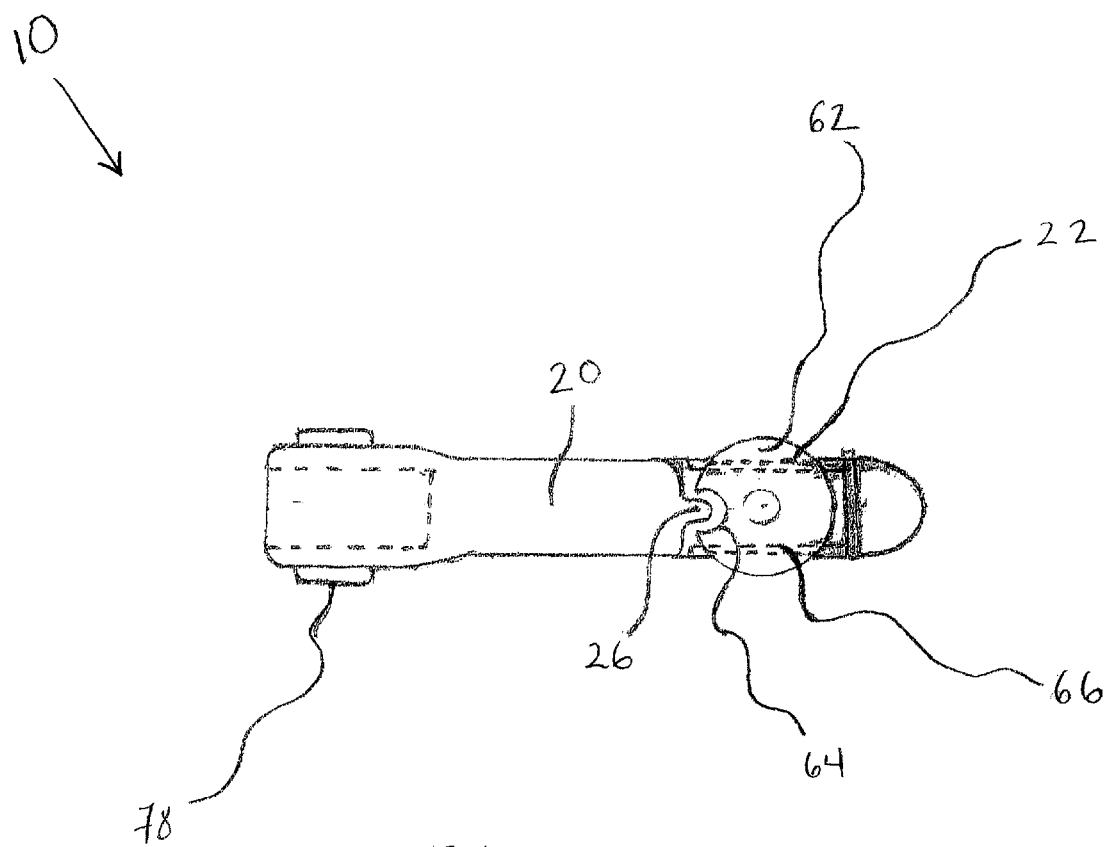
FIG. 12 is a top view of the assembled shackle with the plunger knob in the open position.
Figure 13:
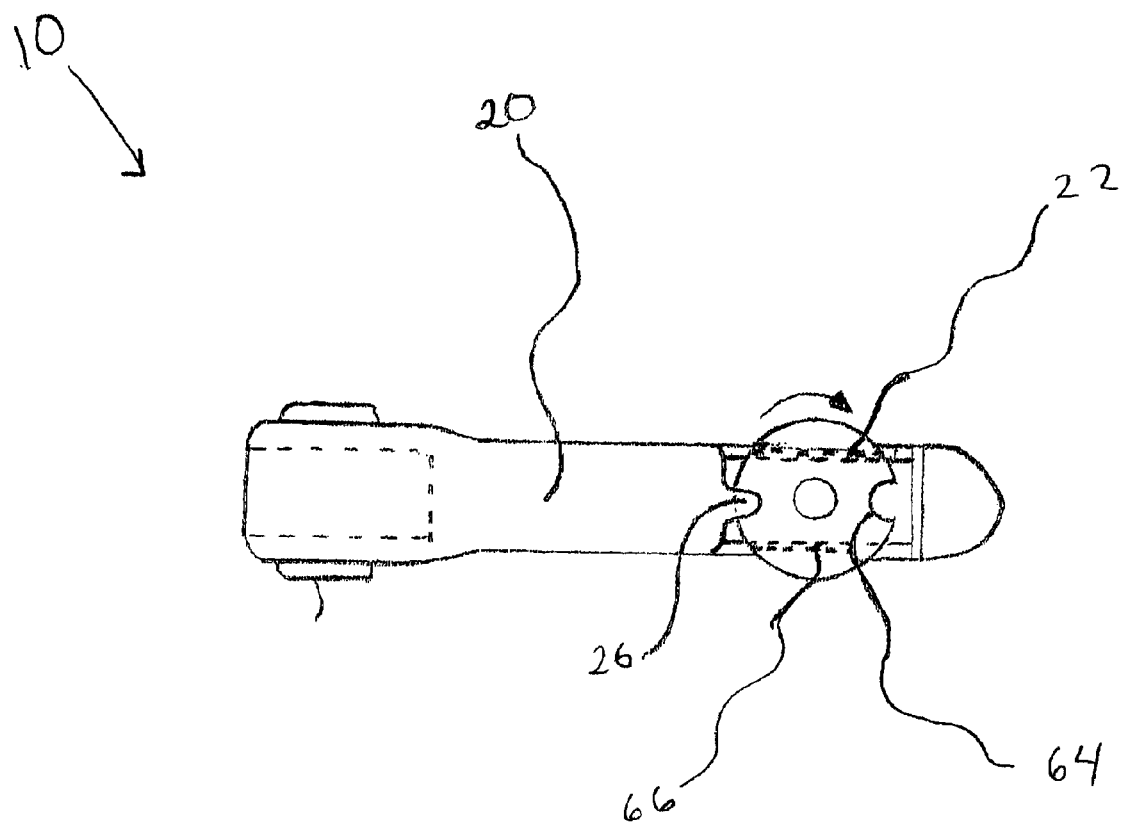
FIG. 13 is a top view of the shackle apparatus with the knob in the closed position.

The shackle apparatus 10 has a locking mechanism. Referring now to FIG. 3, the shackle body 20 has an anti-rotation plunger means 22. This anti-rotation plunger means 22 works in consortium with the mating means 66 on the underside of the knob 62 pictured in FIG. 11. Referring now to FIG. 12, working together, the anti-rotation plunger means 22 and the mating means 66 work to prevent the rotation of the plunger pin 68 so that notch 64 does not line up with lip 26. Lip 26 prevents the retraction of plunger pin 68 so long as notch 64 is not rotated under lip 26. This consortium formed between the anti-rotation plunger means 22 and the mating means 66 form the locking mechanism of the shackle apparatus 10.

Referring again to FIG. 3, in the preferred embodiment, the anti-rotation mating means 22 is a positive key-type protrusion on either side of the plunger pin opening 24. Now, referring to FIG. 11, the mating means 66 are keyway slots on the underside of the knob 62. These mating means 66 can straddle the positive key-type protrusions that are the anti-rotation plunger means 22 and form a locking mechanism. In all other embodiments, the anti-rotation plunger means and the mating means are any design that prevent the knob 62 from rotating, and therefore allow lip 26 to prevent the plunger pin 68 from retracting. It is not necessary in alternate embodiments that the knob rotate 180 degrees to lock or unlock, but rather, just that there be varying positions alternating from lock to unlock reached by rotating the knob around its axis. In all embodiments, the anti-rotation plunger means 22 and the mating means 66 mate, and therefore possess corresponding mating structural patterns. Other embodiments include serrations or a multiple set of grooves under the knob 62 acting as mating means 66, corresponding to serrations or multiple sets of grooves as the anti-rotation plunger means 22 surface. Other embodiments include a square or other geometric shaped protrusions with 90 degree angles protruding up from and forming the anti-rotation plunger means 22, and corresponding holes acting as the mating means 66 on the underside of the knob 62, as well as any kinematic inversion of the mechanism, i.e. instead of a notch in the knob to fit into a keyway on the shackle body, placing the notch on the shackle body to fit into a keyway in the knob. Many other embodiments are possible, and will be readily apparent to those skilled in the art, but in any embodiment, the anti-rotation plunger means 22 and the mating means 66 act in consortium to prevent non-voluntary rotation of the knob 62.

Referring now to FIG. 12, the knob 62 and the mating means 66 fit over anti-rotation plunger means 22 on the shackle body 20. When the knob 62 is twisted such that the mating means 66 and the anti-rotation plunger means 22 mate, the spring 71 in the plunger pin opening 24 pulls the knob 62 down onto the anti-rotation plunger means 22 and locks the knob 62 from further rotating. The knob 62 can seat onto the anti-rotation plunger means 22 in two orientations, zero degrees and 180 degrees. Zero degrees will be assumed to be the orientation where the notch 64 lines up with the shackle body lip 26 and 180 degrees will be assumed to be where the notch 64 is opposite the shackle body lip 26. Once the anti-rotation plunger means 22 and the mating means 66 are mating, the knob 62 will become locked in place. Thus, the plunger pin 68 will be locked in place as well, locking the shackle apparatus 10 either in the open setting or the closed setting. The anti-rotation plunger means 22 and the mating means 66 working together serve beneficial purposes. First, when the knob 62 is turned to zero degrees the antirotation plunger means 22 forces the notch 64 to automatically line up with the shackle body lip 26. In this orientation, it is very easy to pull the plunger pin 68 to open the shackle apparatus 10 as everything is perfectly lined up. No guesswork or feeling around is required. Thus, the shackle can be snapped shut without the user having to fiddle with the knob 62 orientation. Second, when the knob 62 is lifted slightly and then turned 180 degrees, it seats back down onto the anti-rotation plunger means 22 and locks in place from any rotation. In this orientation, the plunger pin 68 can not accidentally rotate into a position to pop open. During extreme flogging, even if the knob 62 ever does manage to pop off the bottom anti-rotation plunger means 22 temporarily, it then tends to settle back and pop onto the anti-rotation plunger means 22 again to lock into place. One reason the knob 62 does not twist and work its way around to unlock position when the knob 62 is turned such that it is not engaged in the anti-rotation plunger means 22 is that the travel that it can move in the axial direction is very small. Because of this small travel in the engaged position, the knob 62/plunger pin 68 assembly does not gather enough inertia during flogging to work its way around or off the anti-rotation plunger means 22.

Referring to FIG. 12, in the preferred embodiment, the locking mechanism works in consortium with the notch 64 and the shackle body lip 26, providing an increases security system which ensures that the shackle apparatus 10 remains in the desired setting regardless of accidental knocking and bumping. In the unlocked position, the anti-rotation plunger means 22 and the mating means 66 are mating. The notch 64 is lined up under the shackle body lip 26. The knob 62 is therefore free to be lifted upwards, causing the spring 71 to compress. The unlocked position allows for the changing of shackle apparatus 10 settings from closed to open or from open to closed. Thus, in this position, notch 64 can pass past the shackle body lip 26. Mating means 66 seat on top of the anti-rotation plunger means 22 to hold knob 62 in its particular aligned orientation.

Figure 14:
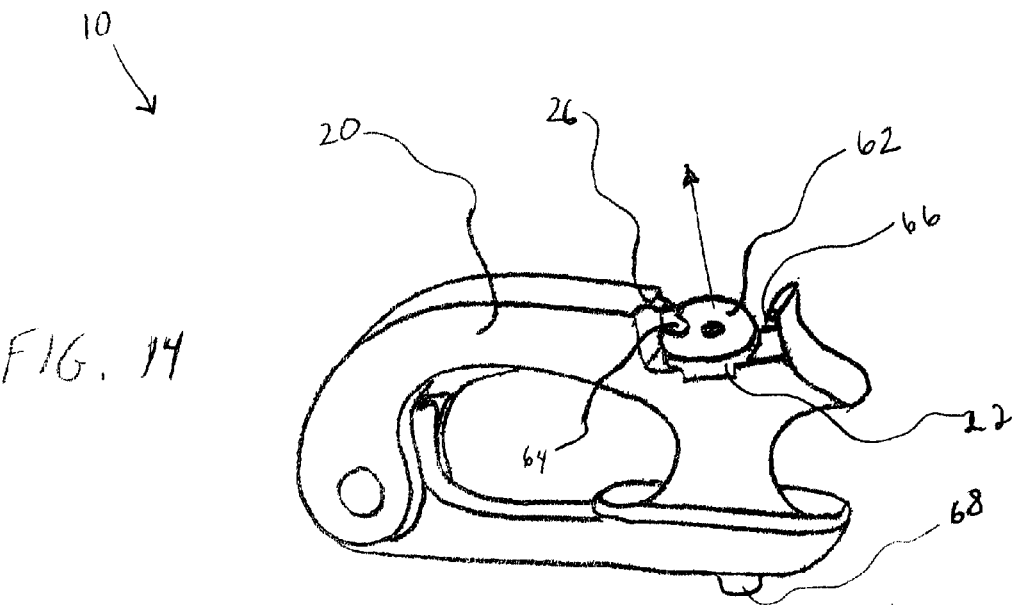
FIGS. 14–16 are isometric views of the shackle displaying the method of locking the plunger knob.
Figure 15:
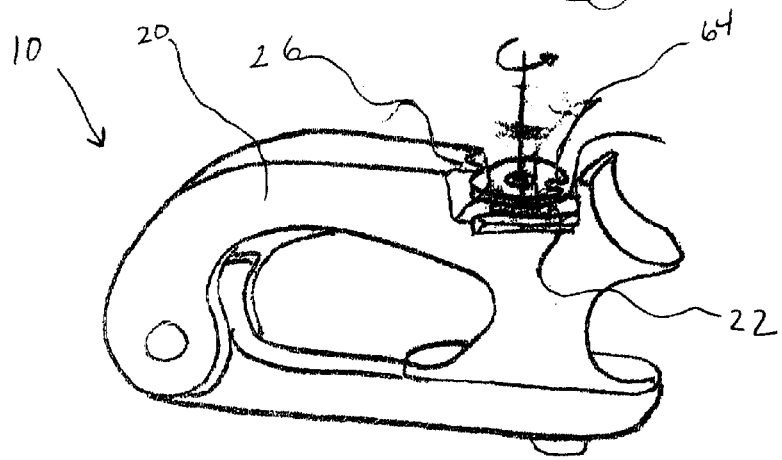
Figure 16:
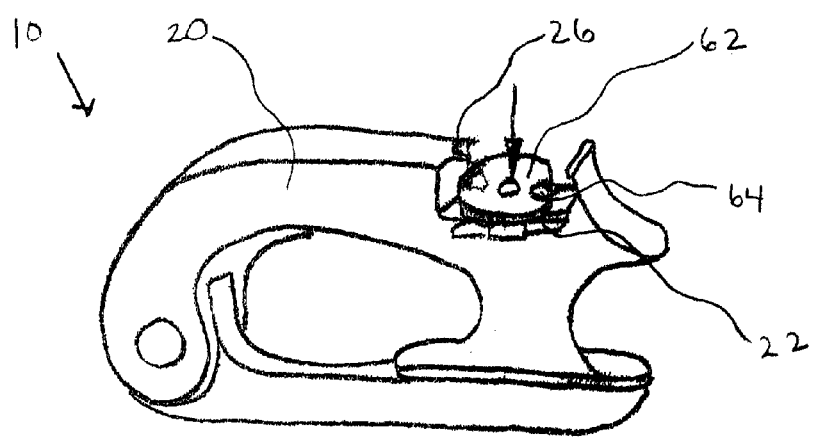

FIGS. 14–16 illustrates the process of changing the knob 62 from the unlocked to locked position. Referring to FIG. 14, the shackle apparatus 10 is in the closed setting, and the knob 62 is in the unlocked orientation, for the notch 64 and the shackle body lip 26 are aligned. The anti-rotation plunger means 22 and the mating means 66 are mating, and the notch 64 is lined up under the structural protrusion 26. Referring next to FIG. 15, the knob 62 has been lifted upward enough by resisting pretension from spring 71 such that the mating means 66 are raised up above the anti-rotation plunger means 22. The arrow illustrates the movement of the knob 62 to complete the rotation. Knob 62 is dimensioned such that the thickness provides that when the mating means 66 are raised above the anti-rotation plunger means 22, the top surface of the knob 62 still has a slight clearance between the shackle body lip 26. Knob 62 is then rotated 180 degrees such that mating means 66 again mate with anti-rotation plunger means 22. Referring now to FIG. 16, the knob 62 has been released and the spring 71 makes it possible for the knob 62 to snap back down to meet the anti-rotation plunger means 22, as illustrated by the arrow. In this orientation, the notch 64 is not lined up under the shackle body lip 26, and can no longer pass past the shackle body lip 26. Knob 62 is constrained from translation by shackle body lip 26 and from rotation by the interference between mating means 66 and the anti-rotation plunger means 22. Spring 71 provides a pretension to secure knob 62 against the anti-rotation plunger means 22. Therefore, the knob is unable to be lifted accidentally, and the shackle apparatus 10 will remain in the current setting until such time that a user chooses to unlock the shackle apparatus 10 and change the setting.

Figure 17:
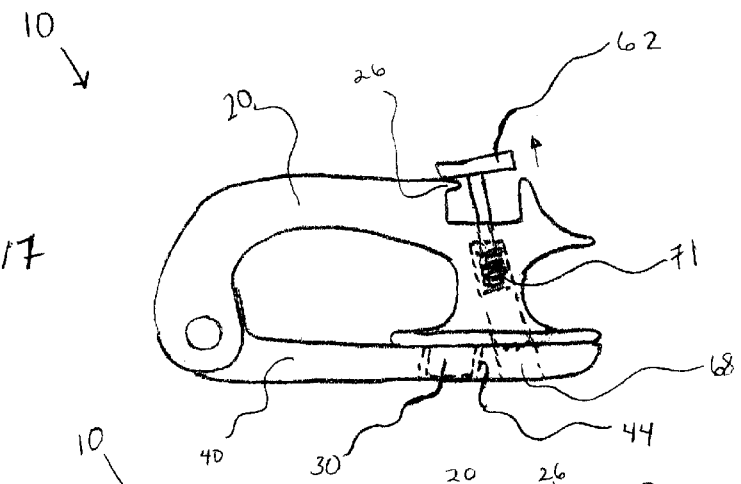
FIGS. 17–19 are side views of the shackle apparatus with the hook in the open position.
Figure 18:
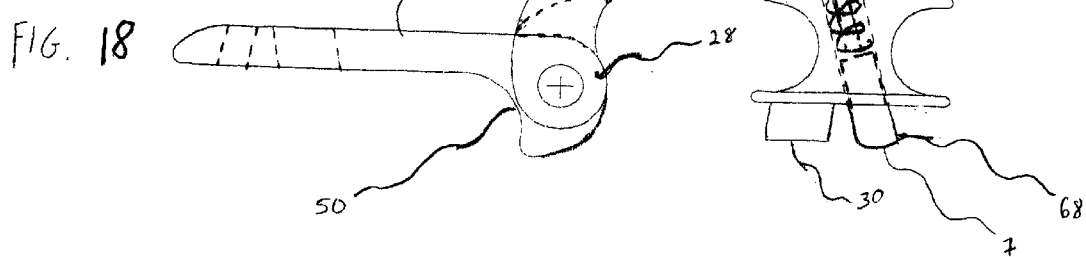
Figure 19:
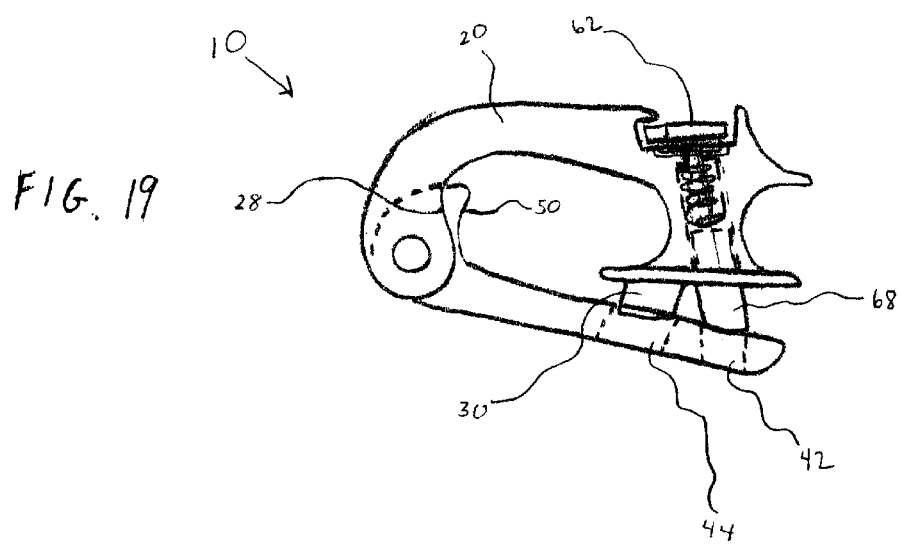

Referring to FIGS. 17–19, the locking procedure of the shackle apparatus 10 is illustrated as well as the change of settings of the shackle apparatus 10 from open to closed. To change the setting of the shackle apparatus 10, the locking mechanism must be unlocked. The unlocking is done as follows. Referring first to FIG. 17, the shackle apparatus is in the closed setting. To change the setting to open, the user must lift the knob 62 upwards, disengaging the plunger pin 68 from the hook body opening 42. The spring 71 is compressed. Once the knob 62 is lifted to its highest position, during rotation of the knob 62 so that the notch 64 is not aligned with the shackle body lip 26, the knob 62 will rest on the shackle body lip 26, preventing the snapping back of the knob 62, and thereby allowing for one-handed manipulation of the shackle apparatus 10 and the line, and then a quick one-hand closing of the shackle apparatus 10. Referring next to FIG. 18, the hook body 40 is pivoted to form the open setting of the shackle apparatus 10.

Referring now to FIG. 19, when the shackle apparatus 10 is to be placed back to the closed setting, the proud surface 50 of the hook body 40 contacts the free end 70 of the plunger pin 68 and compresses the spring 71 to push the plunger pin 68 into the plunger pin opening 24. As the hook body 40 pushes the plunger pin 68 into the plunger pin opening 24, the mating means 66 on the knob 62 and the anti-rotation plunger means 22 resist any twisting of the plunger pin 68 due to unsymmetrical or off center forces imparted by contact with hook proud surface 50. As a result of the guiding created by the mating means 66 against the anti-rotation plunger means 22, the knob 62 with its corresponding notch 64 retains its proper orientation with respect to the shackle body lip 26. This characteristic allows the shackle apparatus 10 to be snapped shut by merely rotating the hook body 40 into the plunger pin 68. Knob 62 does not have to be pre-aligned with respect to the shackle body lip 26 due the built-in pre-alignment inherent with the configuration. As a result, shackle apparatus 10 can be closed without excess need of physically seeing or feeling the knob orientation. As the hook body 40 is further closed against the shackle body 20, the free end 70 of the plunger pin 68 pops into the hook body opening 42, effectively securing the shackle apparatus 10 into the closed setting. At this stage, knob 62 can be lifted, rotated 180 degrees and set back down again mating the anti-rotation plunger means 22 with the mating means 66 so as to place shackle apparatus 10 in a locked state.

FIG. 20 and FIG. 19 demonstrate that hook surface 50 is raised or "proud" with respect to the inside wall clevis 28 of the shackle body 20 when the shackle apparatus 10 is in the closed position. This proud arrangement is very subtle, but provides a great benefit. When the shackle apparatus 10 is in use, the sailor is usually unable to use two hands for most operations as one hand is required to hang onto the boat. Assume that the sailor has pulled the plunger pin 68 all the way open so far that the knob 62 is resting above the shackle body lip 26. In this position, if the knob 62 is turned back so that the notch 64 aligns with the shackle body lip 26, the plunger pin 68 will snap shut. With the "proud" surface 50 of the hook body 40, any force created by pulling on the knob 62 helps hold the hook body 40 in a close position. Then, the plunger pin 68 is turned and allowed to snap down, and the shackle apparatus 10 will close. The "proud" surface 50 creates a rotation movement which will hold the hook body 40 firmly against the shackle body 20 at the area where the plunger pin 68 engages the hook body opening 42, which will allow for snap closing. This becomes even more important for quick closing of the shackle apparatus 10 during sailboat racing or where only one hand of the sailor is available.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A shackle with a locking mechanism, the shackle comprising:
    a shackle body comprising:
        a hook opening with two shackle pivot holes;
        a plunger pin having a plunger pin opening and a corresponding plunger pin exit; an anti-rotation plunger means wherein said plunger pin opening is located on said anti-rotation plunger means;
        a shackle body lip extending over said anti-rotation plunger means;
    a hook body with a pivotal end having two sides, said hook body comprising:
    a hook pivot opening; and
    locking end; and
    a slot positioned in the locking end of said hook body wherein said pivotal end being pivotally connected within said hook opening of said shackle body by said pivot pin extending through said shackle pivot hole and hook pivot hole and wherein said slot corresponds to said plunger pin opening; and
        wherein said plunger pin further having a free end and a smaller end, such that free end diminishes in size towards said smaller end, said smaller end of said plunger pin being axially inserted into said slot of said hook body and extending into said plunger pin opening in said shackle body, and wherein said plunger pin further having two positions defining a closed setting and an opening setting,
        wherein the closed setting is provided when said free end rests in said slot of said hook body, and the open setting is provided when said free end remains in said shackle body;
        a spring positioned around the smaller end of said plunger pin and located inside said plunger pin opening in said shackle body and constrained by the corresponding plunger pin exit in said shackle body, wherein compression and release of said spring creates the two positions of said plunger pin; and
        a knob attached to said smaller end of said plunger pin and resting on said anti-rotation plunger means on said shackle body, said knob having an opening that accepts said plunger pin, and
        a mating means on an axial face which mates with said anti-rotation plunger means such that when said mating means and said anti-rotation plunger means mate, the locking mechanism is provided wherein the plunger pin is locked into said one of said two positions, lifting said knob compresses said spring and allows said position of said plunger pin to change to said other position.

2. The shackle in claim 1, wherein said knob further comprises a notch on a radial surface such that said notch mates with said shackle body lip to allow lifting of said knob, and when said notch is not mating with said shackle body lip, said knob is prevented from being lifted.

3. The shackle in claim 1, wherein said shackle body further comprises a structural protrusion.

4. The shackle in claim 3, wherein said hook body further comprises an opening on said hook body such that said opening mates with said structural protrusion on said shackle body such that when mated with said hook body, said structural protrusion reduces the possibility of permanent bending damage to said plunger pin and increases the overall strength of said shackle.

5. The shackle in claim 1, wherein the hook pivot opening further comprises a clevis attached therethrough, said clevis having a surface and an inside wall such that said pivotal end of said hook body is adjacent to the surface of said clevis and aids in closing said shackle with one hand.

6. The shackle in claim 1, wherein said hook body further comprises a hook boss on each of said two sides of said pivotal end, such that said hook boss ensure that burrs of worn or deformed metal along said clevis do not cause unwanted friction or binding.

7. A shackle locking mechanism having an open position and a closed position, said shackle locking mechanism comprising:
    a shackle plunger pin, said plunger pin having a free end and a transition to a smaller end; a spring positioned around the smaller end of said plunger pin, said plunger pin and spring located inside the shackle;
    an anti-rotation plunger means;
    a shackle body lip extending over said anti-rotation plunger means;
    a knob attached to said smaller end of said plunger pin, said knob having an opening that accepts said shackle plunger pin; and
    mating means which engages said anti-rotation plunger means such that when said mating means and said anti-rotation plunger means are engaged, said locking mechanism is provided such that said plunger pin is locked in said locked position, and wherein lifting said knob compresses said spring, thus disengaging said mating means from said anti-rotation plunger means thus providing the open position of the shackle.

8. The shackle locking mechanism in claim 7, wherein said knob further comprises a notch on a radial surface such that said notch mates with said shackle body lip to allow lifting of said knob, and when said notch is not engaged with said shackle body lip, said knob is prevented from being lifted.

* * * * *